R. L. EDWARDS.
COTTON HARVESTER.
APPLICATION FILED FEB. 27, 1908.
975,125.
Patented Nov. 8, 1910.
5 SHEETS—SHEET 5.
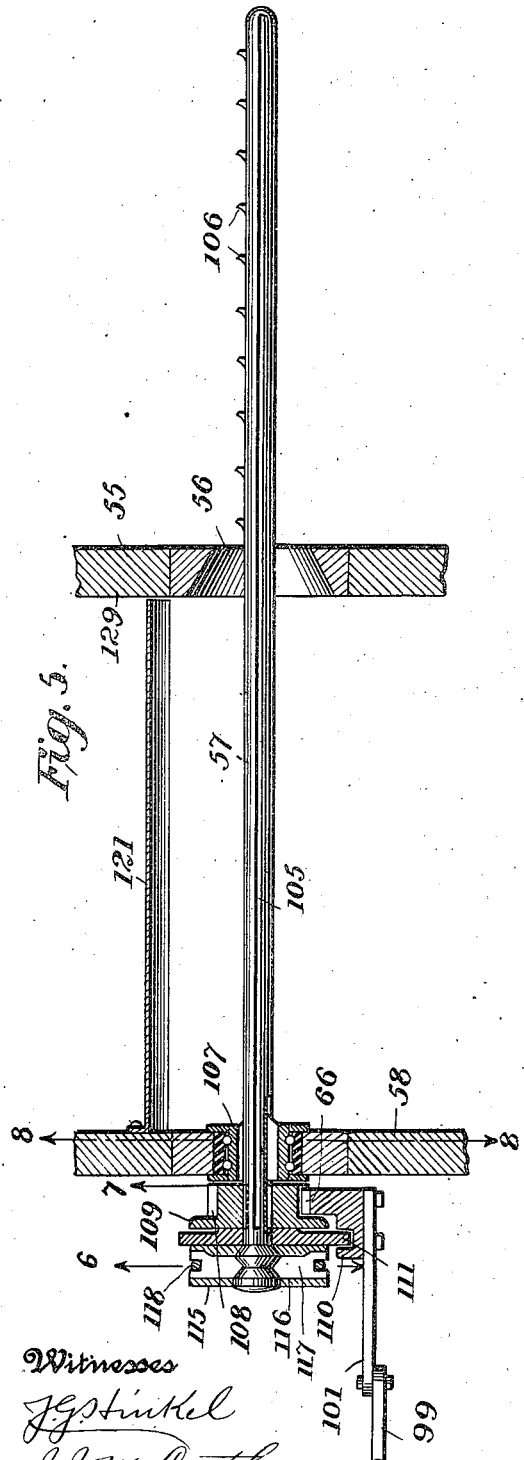
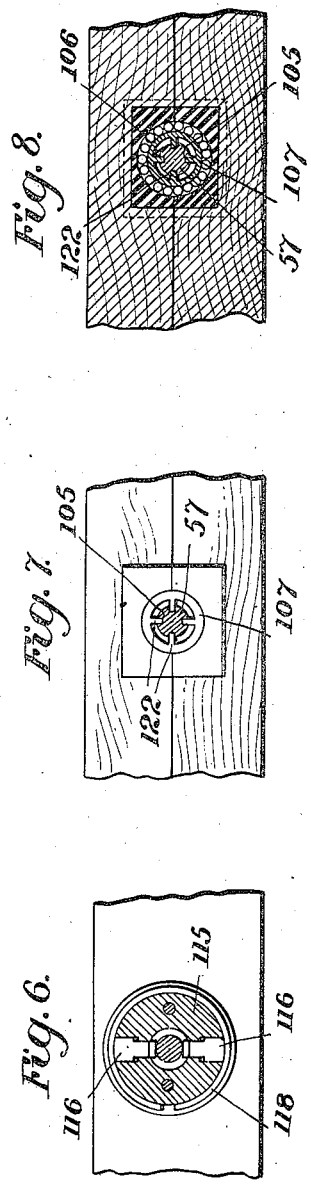
Witnesses
J. G. Stinkel
J. J. McCarthy
Inventor
Robert L. Edwards
By
Foster, Freeman, Watson & Co.
Attorneys

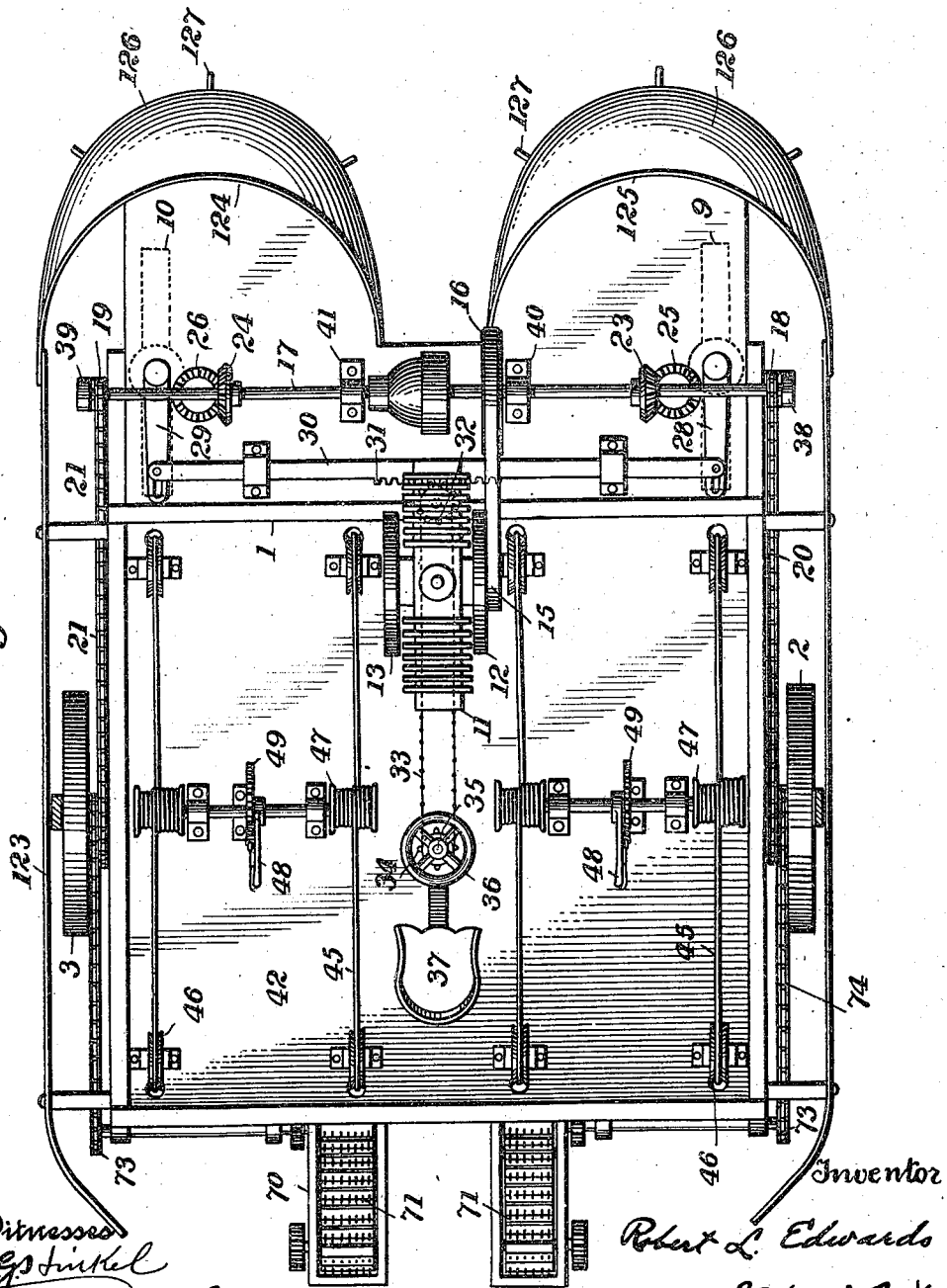

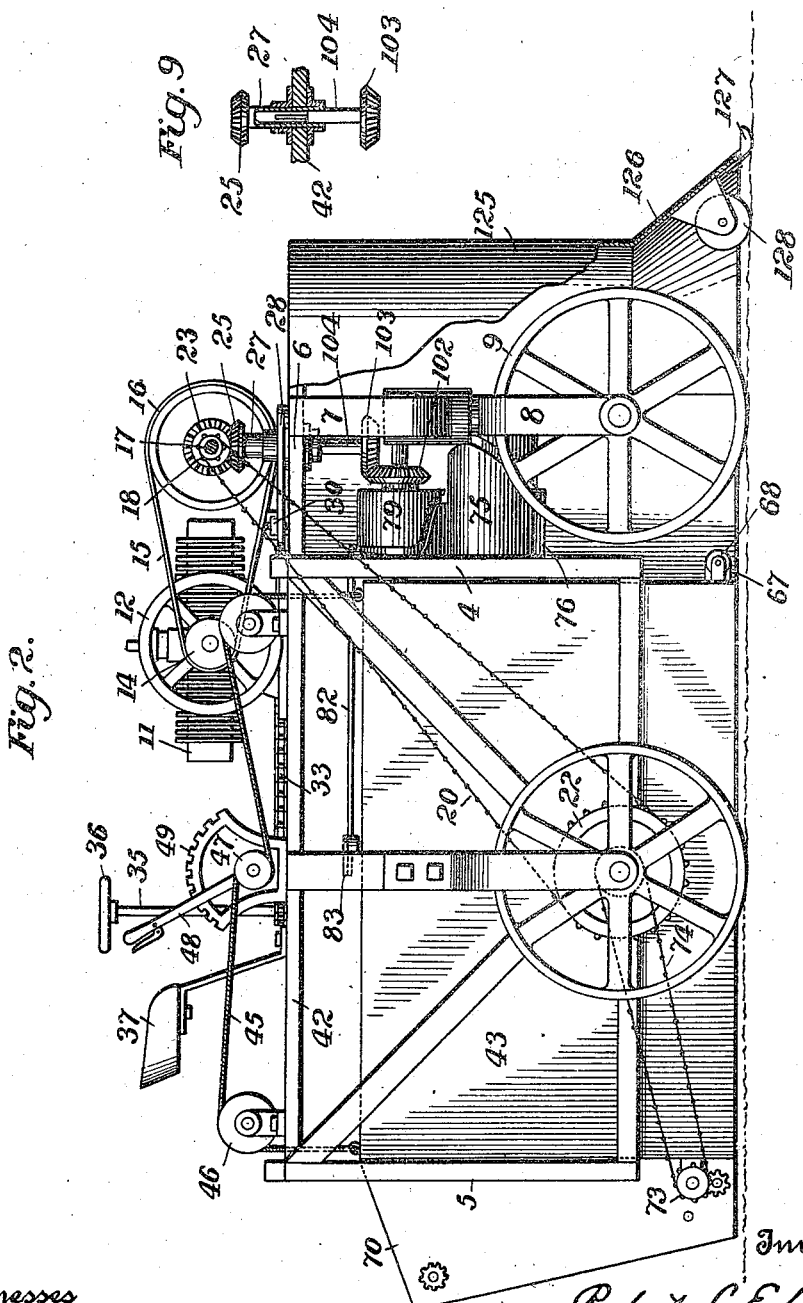

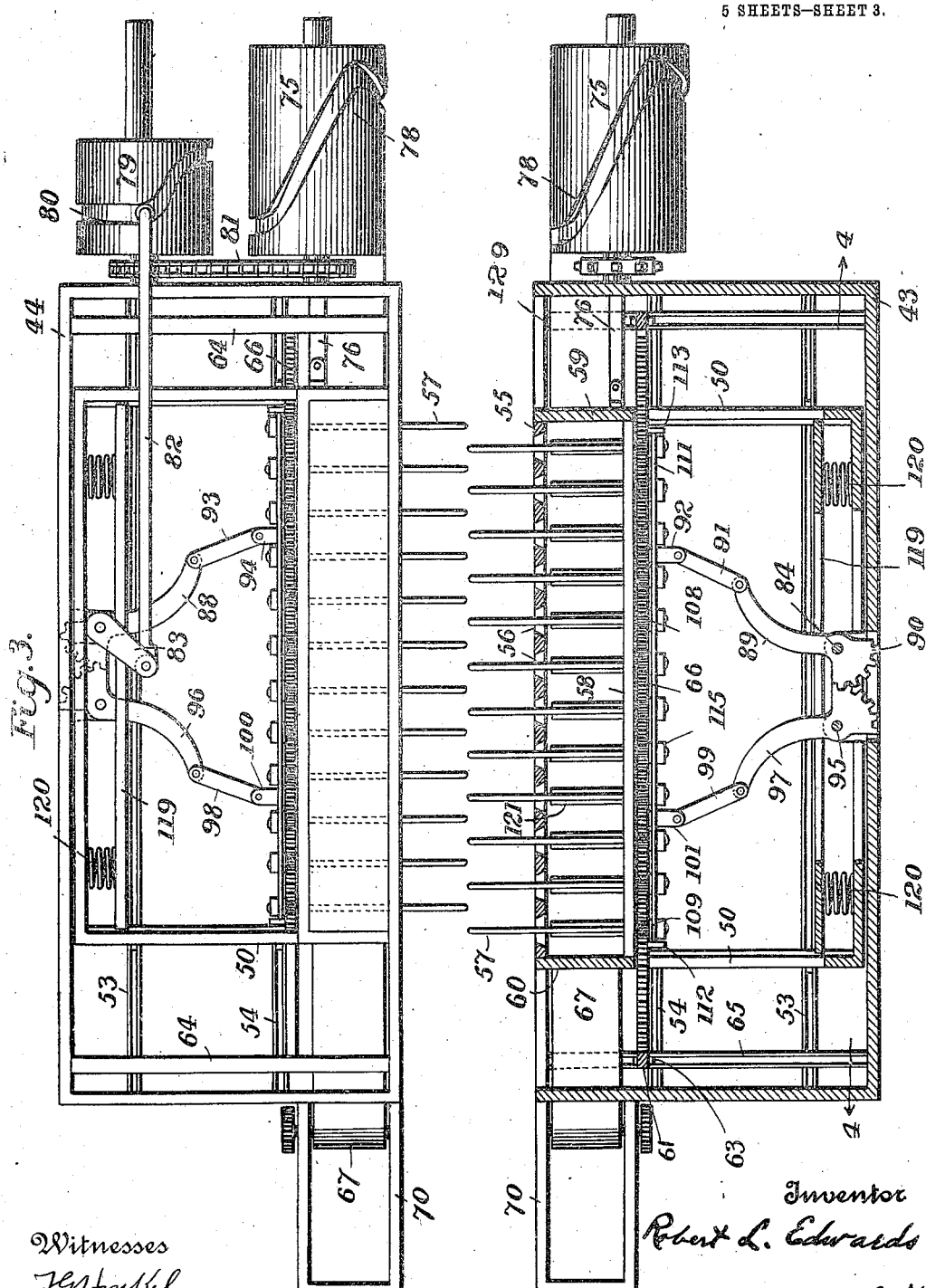

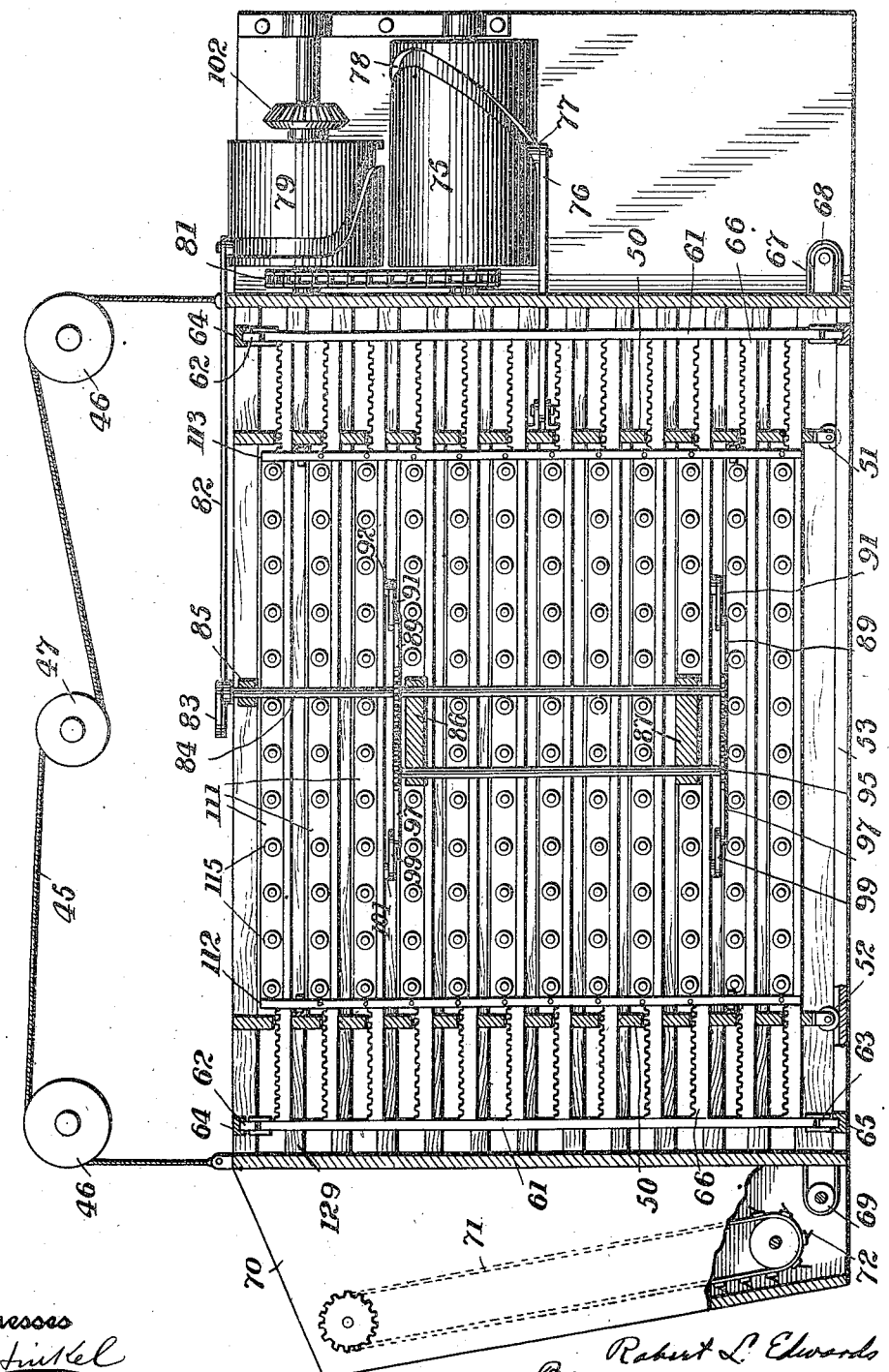

UNITED STATES PATENT OFFICE.

ROBERT L. EDWARDS, OF DARLINGTON, SOUTH CAROLINA.

COTTON-HARVESTER.

975,125.

Specification of Letters Patent.    Patented Nov. 8, 1910.

Application filed February 27, 1908. Serial No. 418,133.

*To all whom it may concern:*

Be it known that I, ROBERT L. EDWARDS, a citizen of the United States, residing at Darlington, Darlington county, South Carolina, have invented certain new and useful Improvements in Cotton-Harvesters, of which the following is a specification.

This invention relates to cotton harvesting machines and particularly to one driven by a hydrocarbon engine. Its objects are to generally improve cotton harvesting machines, and to produce one which will be automatic and efficient in operation, harvesting a maximum amount of the cotton contained on the stalks over which it is passed. It also includes means for cleaning the cotton to a great extent from trash.

The various novel and improved features are pointed out hereinafter and set forth in the attached claims.

It is well known that cotton is planted in rows three or four feet apart. My machine is adapted to straddle such a row, being made up of two similar sections connected together by framework at the top and having an open passage with vertical side walls lengthwise centrally through the bottom part, the said passage having sufficient height and breadth to allow the machine to pass over the stalks without breaking them. Each section carries framework upon which are mounted picking spindles which are adapted to be projected through the side walls of the passage and into the space occupied by the cotton stalks. These spindles rotate at a high speed when projected into the cotton space and being provided with small teeth engage the cotton fiber wherever it is touched and retain it wrapped tightly around the spindles. These spindles are placed sufficiently close together to touch most of the open bolls of cotton when once projected, and as pointed out hereafter, the machine is so constructed that different spindles at different places along the length of the machine will at different times project into the same cotton space but in different positions therein, thus practically reaching every spot where a boll of cotton can be found. Means is not only provided for rotating the spindles and for projecting and withdrawing them at the right time, but also for making them stay in one spot when projected into the cotton space while the machine itself goes forward. The spindles themselves are of novel construction and are mounted in a novel way both as to their rotation and as to their projection into and withdrawal from the cotton space. They furthermore are so mounted that they will automatically stop moving forward into the cotton space and will not break when they strike a hard obstruction but will continue their rotation. I have also provided means for raising or lowering either or both spindle carrying sections of the machine without interfering in any way with their operation. The cotton is automatically stripped from the spindles when they are withdrawn into the casings of the two sections and the cotton is collected therein.

In the accompanying drawings,—Figure 1 is a plan view looking down on top of my improved machine; Fig. 2 is a side view with a part of the casing or armor surrounding the working parts removed; Fig. 3 is a horizontal section of one half of the machine and a plan view of the other half, parts being shown in full lines and the armor and supporting frame being omitted; Fig. 4 is a sectional side view of one of the spindle carrying sections taken upon the line 4—4 of Fig. 3; Fig. 5 is a cross section of a fragment of the device showing a picking spindle on an enlarged scale; Fig. 6 is a cross section on line 6—6 of Fig. 5; Fig. 7 is a cross section on line 7—7, Fig. 5, showing a fragment of attached parts in full lines; Fig. 8 is a section on line 8—8, Fig. 5; Fig. 9 is a sectional view of a part of the driving connections.

As shown in the drawings my machine embodies a main frame 1 which carries bearings for the drive wheels 2, 3, and which supports all of the working parts of the machine. The drive wheels are shown as placed near the rear of the machine and outside the main frame. This frame includes the vertical members 4 and 5 and suitable braces. It is also provided with extensions 6 projecting forwardly at its top in advance of the forward vertical member 4. These forward extensions have rigidly attached thereto vertical bearings 7 for the forked support 8 for the front or guide wheels 9, 10. It will be noted that these wheels are within the side lines of the main frame and are so arranged that they may be turned for the purpose of guiding the machine. This turning is effected through the vertical pivot bearings of the forked supports 8, the lower ends of these forks having suitable bearings for the axles of the wheels.

A hydrocarbon engine 11 is mounted on the main frame 1 at its central forward part, and is provided with the fly wheels 12, 13 and the pulley 14. I have shown this pulley connected by belt 15 to pulley 16 on the cross shaft 17, but it is to be understood that any other suitable driving connection may be used between the engine and shaft. The shaft 17 is the main operating shaft of the machine, from which the moving parts are driven, and as shown it is mounted in bearings on top of the main frame in front of the engine and is provided with differential gear. It extends entirely across the frame and has beyond the edge of the frame pinions 18, 19 connected by link chains 20, 21 with larger pinions 22 on the axles of the driving wheels. It will be understood that it is necessary to use two chains or similar driving means, one for each wheel, by reason of the fact that the axles of those wheels are separate. The axle cannot extend straight across the machine, for if it did it would be directly in the cotton space. Bevel gears 23, 24 are also mounted on shaft 17, and are adapted to coöperate with similar gears 25, 26 on vertical shafts 27 extending down into the machine.

The forked supports between the front wheels and the frame are turned on their pivot bearings to guide the machine by means of slotted arms 28, 29 connected thereto and projecting rearwardly on top of the machine. These arms may be turned by any suitable means, and I have shown for that purpose the sliding rod or bar 30, having at its ends pins entering the slots of the arms. This bar has along its center the rack teeth 31 in engagement with the toothed pinion 32. This pinion is connected by chain 33 with another pinion 34 which is attached to the rod 35 which has upon its upper end a hand wheel 36 convenient to the operator who sits on the seat 37. It will be understood that rotation of the hand wheel in one direction or the other slides the bar 30 in one direction or the other by means of the connecting pinions and chain, and that consequently the front wheels are turned to guide the machine in the direction desired. The front wheels being within the margin of the machine permits this turning without projecting beyond the machine and into the side rows of cotton. It will also be understood that any suitable clutch or speed regulating mechanism may be used between the engine and the main driving shaft 17. The shaft is provided with bearings 38, 39, 40 and 41.

The specific features of construction so far described relate to the fundamental elements of a cotton harvester and the means for operating it, and while I regard them as efficient for the purpose, I do not wish to limit myself to them since the main features of my invention hereafter described may be used with equal advantage with substitutes such as will occur to those skilled in the art. It should be noted, however, that the use of a hydrocarbon engine as the propelling means by which the speed of the harvester can be regulated and made as slow as desired, renders it possible to accomplish results which never could be accomplished by a machine drawn by horses or other animals that move at a speed which is too great to secure the best results. In my study of this subject I have reached the conclusion that the practical failure of many harvesting machines has been due to the fact that it was thought necessary to construct them for use at the speed at which horses ordinarily walk. I have specially constructed my machine for use at a lower speed and have therefore combined it with a hydrocarbon engine driving means.

Considering now the parts of the machine wherein the main features of my invention reside, it will be noted that the two halves of the machine on opposite sides of the central cotton space are precisely alike and that a description of one will serve for both.

Mounted in the main frame 1 below the cover plate 42 are the secondary frames 43, 44. These frames are not quite as high as the main frame so as to give room for vertical adjustment therein. They fill the spaces between the cotton space and the outer wall of the main frame having sliding engagement therewith at the ends and side so that they may be easily moved vertically. In order to effect this vertical motion I have shown four cords or chains 45 for each frame connected to the four corners extending upwardly through holes in the cover plate of the main frame over pulleys 46 and onto drum 47. All of the cords for one frame are attached to the same drum so that any revolution of that drum winds the cords the same amount and thus produces an even raising or lowering of the frame and avoids binding. The drum 47 is operated by the handle arm 48 which engages segment 49 to hold it in any desired position.

Within the secondary frame 43 is mounted the third frame 50 which fits closely within frame 43 in so far as height and breadth are concerned but which is not so long. It is mounted upon rollers 51, 52 (Fig. 4) running in track-ways 53, 54 in the bottom of frame 43. There are four or more of these rollers, there being at least two for each track-way. The purpose of this mounting is to permit frame 50 to move lengthwise within frame 43. The inner wall of frame 50 is covered by slats 129 of the secondary frame and alternate slats 55 of frame 50 having numerous holes 56 therein for the passage of the picking fingers or spindles 57. Spaced from and parallel with wall 55 the frame 50 is provided with wall 58, having bearings therein through which the picking spindles pass. The short end walls 59, 60 join the ends of the walls 55 and 58 to form a cotton receiving space which is rectangular in cross section. The picking spindles pass through this space and as hereafter pointed out the cotton on the spindles is stripped therefrom in this space and falls to the bottom thereof when the spindles are drawn back into the frame.

It will be observed that the inner wall 55 is made up of longitudinal slats on the secondary frame and shorter longitudinal slats on frame 50, which slats on frame 50 are provided with the holes 56. The slats carried by frame 50 of course move longitudinally of the machine with that frame, and since the two sets of slats practically meet at their top and bottom edges they form a wall for the cotton picking space which is practically continuous.

Back of plate 58 there is mounted a narrow vertical frame 61, which has at its top and bottom rollers 62, 63 which run in track-ways 64, 65 near the ends of the secondary frame 43 and extending across the same. This permits the frame 61 to move back and forth across frame 43 and sufficient space is allowed so that it may move back away from wall 58 until the ends of the picking spindles are within that wall. This frame 61 is provided with numerous separated toothed racks 66 which extend lengthwise thereof, one rack being provided for each row of picking spindles. The spindles are connected to and move with the frame and racks as hereafter specifically described. As shown in the drawings when frame 61 is near wall 58 the picking spindles 57 project through wall 58, through wall 55 and the intervening cotton receiving space and also half-way to the wall of the opposite section of the machine. As this frame is moved away from this wall, the spindles being withdrawn through the walls 55, 58 are stripped of their cotton at the wall 58, which cotton falls to the bottom of the cotton receiving space between the walls and is carried to the rear of the machine by a wide belt conveyer 67 which is mounted on the pulleys 68, 69. At the rear end of this belt and in an extension 70 of the frame 43, I have shown a belt conveyer 71 having thereon projections 72 adapted to engage the cotton delivered by belt 67 and to raise it to the top of the machine where it is to be delivered into any suitable receptacle not shown. This second conveyer extends at a slight inclination to the vertical and is mounted on suitable pulleys. These two conveyers are operated by suitable connection from pinion 73 driven through chain belt 74 from the axle of the driving wheels and they both operate together.

It will be noted that each half of the main frame has mounted therein three other frames each having motion in a different direction within the main frame, and this makes it necessary to have flexible driving connection between the engine on the main fixed frame and these movable frames. The frame 43 has no motion within the main frame save vertically and this frame carries the frames 50 and 61 and imparts to them the same vertical motion. Frame 50 moves lengthwise of frame 43 but not laterally whereas frame 61 moves laterally but not lengthwise. The lengthwise motion is given to frame 50 by cam 75 having suitable bearings at the forward end of frame 43 and coöperating with the sliding rod 76 attached to the frame. The rod 76 has at its forward end a roller 77 coöperating with the cam groove 78 made in the cylindrical surface of the cam member 75 of the proper shape to effect the desired motion of the frame. The sidewise motion of frame 61 is imparted from cylindrical cam piece 79 having therein the cam groove 80 of the proper shape. The two cam pieces 75, 79 have operative connection through suitable pinions on their shafts and the connecting operating chain belt 81. The frame 61 is operated from cam groove 80 by means of the sliding rod 82 having at one end a roller working in the groove and being connected at its other end to an operating arm 83 secured to a vertical shaft 84 adapted to rotate in bearings 85, 86, 87 mounted on the inner side of the outer wall of frame 43 near the center. This shaft 84 has secured thereto near the bearings 86, 87, the arms 88, 89 which arms have upon their shorter ends segmental gears 90. The outer end of arm 89 has pivotally secured thereto link 91 which is also pivotally secured to an ear 92 fastened to one of the racks 66 of frame 61. Arm 88 is similarly connected to link 93 secured to ear 94. A shaft 95 is rotatively mounted in the bearing pieces 86, 87, and has adjacent those bearings, arms 96, 97 similar to arms 88, 89, and having similar connection through links 98, 99 and ears 100 and 101 with racks 66. The gear segments on 89, 97 mesh as do those on 88, 96 so that these arms move together. It will be obvious that the rod 82 being moved lengthwise by the cam turns the arm 83 and consequently the arms 88, 89, 96 and 97, and thus draws the frame 61 away from or pushes it toward wall 58 according to the direction in which the rod 82 is moved. It will also be noted that the four similar link arm connections operating together and being attached to the frame at widely separated points will give to all parts of it a uniform and even motion and will prevent tipping and binding. This frame 61 may be made of different form and may be operated by different means but it is preferably made thin so that it can be moved back the requisite distance without making the frame 43 too wide in order to give it space.

The cam cylinder 79 has fixed to its shaft the bevel gear 102 which meshes with the bevel gear 103 on the end of the short vertical shaft 104. This shaft 104 has sliding key connection with the interior of hollow shaft 27 which is rotated in a fixed position by the main driving shaft 17. This permits the bevel gear 103 to rise and fall with the rise and fall of frame 43 without breaking the driving connection with the driving shaft. I have shown this as a suitable means for flexibly connecting the driving and driven parts of the machine, but its particular form constitutes no part of my invention and therefore other connecting means may be employed and they will readily occur to mechanics skilled in the art.

The picking spindles 57 which I use are made of metal preferably steel and they are provided throughout their length with grooves 105. See particularly Figs. 5, 6, 7 and 8. I preferably make the spindle solid and provide them with four of these grooves ninety degrees apart as shown. These spindles are also provided between the grooves with one or more rows of sharp picking projections or teeth 106 which can be made to disappear by proper mechanism. One row is sufficient and it should extend about half the length of the spindle from the outer end. The spindles are mounted in bearing sleeves 107 in the wall 58 and are adapted to slide lengthwise therethrough. These bearing sleeves have cylindrical openings lengthwise therethrough longer in diameter than the spindles so that the spindles may be withdrawn therethrough without hitting the projections 106 against the sleeve. These sleeves also have on their interior four longitudinal ribs 122 which fit closely the grooves in the spindle, the ends of these ribs projecting slightly from the end of the sleeve into the cotton receiving space and being inclined downwardly into the grooves as shown in Fig. 5. These points are cutting edges. The sleeves are mounted to turn in bearings in wall 58 and I prefer to use ball bearings as shown to lessen the friction. Each spindle has mounted thereon beyond the wall 58 a toothed pinion 108 adapted to engage one of the racks 66 on frame 61 and having the flange 109 which fits behind the upper edge of the rack bar. The pinion has interior projections like those on the sleeve 107 fitting within the grooves in the spindle, and thus it may slide lengthwise of the spindle without losing its operative engagement therewith for the purpose of rotating it. It will be seen by reference to Fig. 5 that the racks 66 are made angular in cross section, the rack teeth being formed on the upright portion and the horizontal portion being provided with groove 110. A thin flat plate 111 extends lengthwise of the machine back of each row of spindles and is provided with holes through which the spindles loosely pass. These various plates are connected at their ends by the thin vertical strips 112, 113 thus forming a frame with its end pieces in close proximity to the ends of frame 50. This frame moves across the machine with the racks 66 since the lower edges of the plates 111 engage the grooves 110, but it also moves lengthwise of the machine with frame 50. It may be provided with rollers at the ends as shown at 114 bearing against the end pieces of frame 50. An anti-friction connection with groove 10 may also be provided if desired.

Connected to the back side of plates 111 are the circular disks 115 having openings in the center for the passage of the spindles and having a circular groove in the circumference. Oppositely disposed radial openings 116 are made in this disk, and sliding locking pins 117 are placed in these openings. The inner ends of these pins are made wedge shaped to fit a wedge shaped groove in the head of the picking spindles. Shoulders within the openings and on the pins prevent undue friction between the pins and the picking spindle. A split spring ring 118 is placed in the circumferential groove of the disks 115 and bears on the outer ends of the pins 117 tending to keep their inner ends in engagement with the groove in the head of the spindles.

It will be seen that when the spindle 57 strikes an obstruction, when being projected from the machine, which is sufficiently rigid the pins 117 will ride up on the inclined surface of the groove in the spindle raising the spring ring with them and allowing the spindle to stop its endwise motion while permitting the pinion 108, plate 111 and disk 115 to continue their movement with the racks 66 of frame 61. This prevents breaking of the spindles when they strike obstructions and it is to be understood that other forms of yielding connection between the spindle and operating parts may be substituted without departing from the spirit of this part of my invention.

It should be observed that by reason of the groove connection between spindle 57 and pinion 108 the spindle is not thrown out of operative connection but continues to rotate with the pinion even when it is prevented from moving endwise. This function for the structure has peculiar advantages since no spindle is thrown out of operation merely because it cannot project its full length across the cotton space, but it operates to pick the cotton right up to the point where the obstruction is just as effectually as if it extended its full length. Near the outer side of the frame 50 is a spring pressed plate 119 supported by springs 120 and when the frame 61 is drawn inwardly for the full length the heads of spindles 57 will come in contact with the plate. This will automatically push into place any spindles which have been displaced by an obstruction on their forward movement. The plate will act as a cushion step to aid in stopping and starting the frame. The pins 117 will enter the groove in the head of the pin and hold it in normal position for another picking operation. The openings 56 in the wall 55 are made with sharp outer edges as shown in Fig. 5 with the purpose of assisting in removing the trash from the cotton collected on the spindles. Each spindle except those in the top row has mounted thereover a hood or shield 121 which extends between the walls 55 and 58 and protects the spindle from cotton dropped from spindles above it. These hoods may be made in any form suitable for the purpose.

It will be observed that the plate 111 and attached parts furnish additional bearings for the spindles which are always in line with the rotary bearings 107, since these parts move longitudinally of the machine together. These two bearings while always in line are not always the same distance apart, since the plate 111 moves across the machine.

The operation of the device may be understood from the above description of the structure except for the timing of the various motions, and I will therefore describe that timing in connection with a general description of the operation.

The operation of the engine which is under the control of the man running the machine turns main shaft 17 at any speed desired. This motion is transmitted by belts 20, 21 to the driving wheels and to the cotton conveyers 67, 71 within the machine and is also transmitted through the sliding bevel gear connection to the cam cylinders 75, 79. The cam groove in cylinder 75 is of such shape that it will drive frame 50 from the front to the rear of the machine at precisely the same speed that the machine itself is moving forward. When it reaches the rear it is drawn forward rapidly to the front and is again driven to the rear at the comparatively low speed. The back and forth motion of this frame carrying the picking spindles with it will rotate those spindles by the action of the pinions 108 rolling on racks 66 which racks do not have the endwise motion. When the frame is being driven to the rear the spindles rotate in the direction in which the picking projections or teeth thereon point and consequently the fiber of the cotton is caught by those teeth wherever it is touched. The cam groove in cylinder 79 and the connecting mechanism is so constructed that when the frame 50 reaches its forward position the frame 61 is pushed quickly toward wall 58 thus projecting the spindles beyond wall 55 into the space where the cotton stalks are bearing the cotton to be picked. The spindles are allowed to remain in this position until the frame 50 approaches its rearmost position when the frame 61 is drawn away from wall 58 withdrawing the spindles from the cotton space. Preferably at the moment that the frame 50 stops its rearward motion the ends of the spindles are just within the wall 55. They then commence their reverse rotation while still receding and thus the cotton which has been tightly wrapped around the spindles as it was collected during the forward rotation is loosened and it is stripped from the spindles by the inclined forward ends of the ribs 122 in the bearing 107 which rotates with the spindles. The spindles may if preferred be withdrawn without rotation. The cotton thus stripped off falls to the bottom of the space between walls 55, 58 and is carried off by the conveyers. Any trash held by the cotton will by the rotation of the spindle be thrown outwardly by centrifugal force against the sharp edge of the opening 56, and will be broken and partly at least dropped on the outside of wall 55. This furthermore frees the cotton from the stalks. The machine is preferably made of such length that the spindle carrying frame will project the spindles into the cotton several times before the machine has moved forward the length of the spindle frame and thus the same stalk of cotton will be subjected to the action several times by successive sets of spindles along the length of the frame. The parts are furthermore so timed that successive spindles will not enter the stalk at the same spot but at one slightly removed therefrom lengthwise of the row thus reaching bolls of cotton which were not reached at the first projection of the spindles. This enables practically every spot in the cotton space large enough to contain a boll of cotton to be reached by a picking spindle. It is to be noted furthermore that the elevating and lowering means disclosed may be used to make the spindles pick at different elevations and thus reach all points of the cotton stalks. The oscillation of the machine will tend to have the same effect particularly if mounted on springs.

The entire machine including the wheels is surrounded by a protecting sheath or armor 123 which is preferably made of sheet metal. This armor has the forward rounded projections the lower parts of which have the semiconical forwardly projecting lower parts 126. These conical extensions are supported by small wheels 128 which roll on the ground and are also provided with the short arms 127 projecting from the edge and touching the ground for the purpose of raising any limbs of the cotton stalks which happen to rest on the ground. This structure of the forward part of the shield raises the limbs of the cotton stalk and directs them into the cotton space where they will be acted upon by the spindles without shaking them unduly or breaking them.

It will, of course, be understood that suitable clutches may be employed for throwing out of operation the cotton picking mechanism without stopping the engine and without breaking the driving connection to the main wheels so that the machine may be driven to and from the place of use without operating all of its interior mechanism.

Having described my invention what I claim is,—

1. In a cotton harvester, the combination with the main frame, having a central cotton space of an armor surrounding said frame the front ends of said armor being rounded upon each side of the central cotton space, forwardly projecting conical extensions of said rounded ends of the armor at the bottom, and arms projecting from said extensions to the ground to engage and elevate fallen limbs of the cotton and direct them into the cotton space.

2. In a cotton harvester the combination with picking spindles, of means for rotating them, means for projecting them into the cotton space and for withdrawing them, and a wall provided with enlarged openings through which the spindles project tapering toward said cotton space, the edges of said openings being made sharp whereby trash is thrown outwardly against them by centrifugal action and is dislodged without being drawn into the machine.

3. In a cotton harvester the combination with the main frame of the machine having a central cotton space, of picking spindles arranged at different elevations adapted to be projected into the cotton space, separated walls through which said spindles pass forming a cotton receiving space, at the side of the cotton space a conveyer at the bottom of said cotton receiving space, means for discharging the cotton from the spindles within this space, and shields over the spindles in this space to protect them from cotton falling from spindles above.

4. In a cotton harvester the combination with rotary picking spindles, of means for subjecting each stalk to the successive action of different sets of spindles at different points longitudinally and vertically whereby practically all points of the stalks are acted upon.

5. In a cotton harvester the combination with rotary picking spindles, of means for projecting all of said spindles at once into the cotton space and means for subjecting each stalk to the successive action of different sets of spindles at different points longitudinally and vertically whereby practically all points of the stalks are acted upon.

6. In a cotton harvester the combination with a series of picking spindles, of two walls through which they are adapted to project into the cotton space, the said walls forming between them a cotton receiving space, means for projecting the spindles through the walls into the cotton space and for withdrawing them, means for rotating the spindles in a forward direction as they are being projected into the cotton space and so long as any part of them is in such space, and means for rotating them in a reverse direction when being withdrawn after their points are within the outer wall.

7. In a cotton harvester the combination with a series of picking spindles arranged in rows, of means for rotating them as the machine moves forward, means for projecting them all at once into and withdrawing them from the cotton space more than once as the machine passes a single stalk whereby different spindles along the length of the row will enter the same stalk, and means whereby upon successive projections the spindles will enter each stalk at a different place lengthwise of the row of cotton from that at which the previous spindles entered it, and means for making the spindles upon successive projections enter the stalks at different elevations.

8. In a cotton harvester the combination with a main frame, of a secondary frame mounted therein, and adapted to be adjusted vertically, a third frame mounted in the second and adapted to be moved lengthwise therein, picking spindles mounted in rotary bearings in the wall of the third frame and adapted to move lengthwise therewith, pinions carried by said spindles, a fourth frame mounted to move crosswise in the second frame and carrying toothed racks with which the pinions on the spindles engage, and connections between said spindles and fourth frame whereby the spindles are projected or withdrawn as said fourth frame moves across the second.

9. In a cotton harvester the combination with the main frame of the machine, of a movable frame carried thereby, means for moving said frame lengthwise of the machine, rotary bearings in said movable frame picking spindles mounted in said bearings, additional bearings for said spindles separate from but in line with said rotary bearings, pinions attached to said spindles, and longitudinally fixed racks with which said pinions engage whereby the spindles are rotated as the frame moves either forward or backward.

10. In a cotton harvester the combination with the main frame of the machine, of a movable frame carried thereby, means for moving said frame lengthwise of the machine, rotary bearings in said movable frame picking spindles mounted in said bearings, additional bearings for said spindles separate from but in line with said rotary bearings, pinions attached to said spindles and longitudinally fixed racks with which said pinions engage whereby the spindles are rotated as the frame moves either forward or backward, and means for moving said racks across the machine to project the spindles into or withdraw them from the cotton space.

11. In a cotton harvester the combination with a wall facing the cotton space, of rotary bearings mounted therein at intervals and provided with interior guide ribs, picking spindles in said bearings having grooves in which said ribs fit, pinions on said spindles back of the bearings the said pinions having ribs making sliding engagement with the grooves in the spindles, a toothed rack engaged by said pinions, means for producing a relative motion of the rack and pinions to rotate the spindles, a frame having frictional engagement with the heads of the spindles back of the pinions, and means for moving said frame toward and away from the wall to project the spindles into and withdraw them from the cotton space.

12. In a cotton harvester the combination with a wall facing the cotton space, of rotary bearings mounted therein at intervals and provided with interior guide ribs, picking spindles in said bearings having grooves in which said ribs fit, pinions on said spindles back of the bearings the said pinions having ribs making sliding engagement with the grooves in the spindles, a toothed rack engaged by said pinions, means for producing a relative motion of the rack and pinions to rotate the spindles, a frame having frictional engagement with the heads of the spindles back of the pinions, means for moving said frame toward and away from the wall to project the spindles into and withdraw them from the cotton space, and a spring pressed plate against which the rear ends of the spindles are withdrawn.

13. A cotton picking spindle having picking teeth, in combination with a sliding guiding support having stripping points, the said spindle being provided with guide grooves lengthwise thereof adapted to receive said sliding guiding supports and stripping points.

14. A cotton picking spindle having picking teeth lengthwise thereof and being provided with four guide grooves lengthwise thereof spaced equal distances apart.

15. A solid cotton picking spindle provided with guide grooves lengthwise thereof and with a row of picking teeth projecting from the surface between adjacent grooves.

16. The combination with a cotton picking spindle provided with teeth and a longitudinal groove, of a stripper having a projection at the forward edge entering said groove to disengage the cotton from the spindle.

17. The combination with a cotton picking spindle provided with a longitudinal row of teeth and a groove adjacent thereto, of a stripper through which said spindle passes in entering the cotton space the said stripper being provided with a projection the bottom of which enters said groove the outer surface of said projection being inclined longitudinally to the surface of the spindle.

18. The combination with a cotton picking spindle having picking teeth and guide grooves lengthwise thereof, of a bearing therefor having guide ribs fitting closely within the grooves and making slidable connection therewith.

19. The combination with a cotton picking spindle having picking teeth and guide grooves lengthwise thereof, of a bearing therefor having guide ribs fitting at their inner edges closely within the grooves and making slidable connection therewith, the said ribs extending beyond the bearing at the forward end and the outer edges of the extensions being cut away to enter the groove at an angle to the surface of the spindle.

20. The combination with a rotatable cotton picking spindle having guide grooves lengthwise thereof, of a cylindrical rotatable bearing therefor having guide ribs upon its interior corresponding to and fitting within the guide grooves.

21. The combination with a rotatable cotton picking spindle having guide grooves lengthwise thereof, of a cylindrical rotatable bearing therefor having guide ribs upon its interior corresponding to and fitting within the guide grooves, the ends of said ribs projecting beyond the end of the bearing and being cut off to enter the grooves at an angle to the surface of the spindle.

22. In a cotton harvester the combination with rotary picking spindles adapted to be projected into the cotton space, of means for projecting and withdrawing them, and flexible connection between the said means and each spindle whereby it may stop in its forward motion when it strikes an obstruction.

23. In a cotton harvester the combination with rotary picking spindles adapted to be projected into the cotton space, of means for projecting and withdrawing them, flexible connection between the said means and each spindle whereby it may stop in its forward motion when it strikes an obstruction, means for rotating the spindles, and connections between said rotating means and spindles whereby no spindle will cease its rotation when stopped in its forward motion by an obstruction.

24. In a cotton harvester the combination with the picking spindles, of a frame for projecting them lengthwise into and withdrawing them from the cotton space, and frictional connection between said frame and spindles whereby a spindle may stop in its forward motion while the frame and other spindles continue to move.

25. In a cotton harvester the combination with the picking spindles, of a frame for projecting them lengthwise into and withdrawing them from the cotton space, frictional connection between said frame and spindles whereby a spindle may stop in its forward motion while the frame and other spindles continue to move, and means for pushing into place all spindles which have been so stopped when the frame is withdrawn.

26. The combination with a cylindrical picking spindle having a wedge shaped circumferential groove near the end, of means for operating said spindle including spring pressed pins with wedge shaped ends fitting in said groove.

27. The combination with a cylindrical picking spindle having a wedge shaped circumferential groove near the end, of means for operating said spindle including radially slidable pins bearing at their inner ends in said groove, and a split spring ring bearing upon the outer ends of the pins and forcing them inward.

28. The combination with a picking spindle provided with longitudinal guide grooves, of a rotatable bearing having interior ribs fitting said grooves and making sliding connection therewith, a toothed pinion on said spindle having ribs slidably engaging the grooves therein, and a toothed rack for turning said pinion.

29. The combination with a picking spindle provided with longitudinal guide grooves, of a rotatable bearing having interior ribs fitting said grooves and making sliding connection therewith, a toothed pinion on said spindle having ribs slidably engaging the grooves therein, a toothed rack for turning said pinion, and means for moving said spindle lengthwise through the bearing.

30. The combination with a picking spindle provided with longitudinal guide grooves, of a rotatable bearing having interior ribs fitting said grooves and making sliding connection therewith, a toothed pinion on said spindle having ribs slidably engaging the grooves therein, a toothed rack for turning said pinion, means for positively moving the rack in a direction lengthwise of the spindle, and frictional connection between said spindle and moving means.

31. The combination with a picking spindle provided with longitudinal guide grooves, of a rotatable bearing having interior ribs fitting said grooves and making sliding connection therewith, a toothed pinion on said spindle having ribs slidably engaging the grooves therein, a toothed rack for turning said pinion, means for positively moving the rack in a direction lengthwise of the spindle, frictional connection between said spindle and moving means, and a plate against which the rear end of the spindle is withdrawn by the moving means.

32. In a cotton harvester, the combination with a frame, of rotary bearings in said frame, parallel picking spindles slidably mounted in said bearings, additional bearings for said spindles separated from but in line with said rotary bearings, means for moving said additional bearings toward and away from said rotary bearings while maintaining them in line therewith, and means connecting said spindles to said additional bearings whereby they will move longitudinally with said bearings.

33. In a cotton harvester, the combination with a frame, of rotary bearings in said frame, parallel picking spindles slidably mounted in said bearings, additional bearings for said spindles separated from but in line with said rotary bearings, means for moving said additional bearings toward and away from said rotary bearings while maintaining them in line therewith, and means yieldingly connecting said spindles to said additional bearings whereby they will normally move longitudinally with said bearings.

34. In a cotton harvester, the combination with the main frame adapted to straddle a row of cotton, of substantially continuous parallel walls facing said cotton, picking spindles adapted to be projected through said walls into the cotton, and means for projecting and withdrawing said spindles and for maintaining them in a fixed position in the cotton during forward movement of the machine.

35. In a cotton harvester, the combination with the main frame adapted to straddle a row of cotton, of substantially continuous parallel walls facing said cotton and made up of parallel slats, a frame movable longitudinally of the machine secured to alternate slats whereby they move with the said frame, picking spindles carried by said longitudinally movable frame, and means for projecting the spindles through the longitudinally movable slats into the cotton.

In testimony whereof I affix my signature in presence of two witnesses.

ROBERT L. EDWARDS.

Witnesses:
W. Y. REID,
STEPHEN H. JACKSON.